(12) United States Patent
Wagner et al.

(10) Patent No.: US 10,858,260 B2
(45) Date of Patent: Dec. 8, 2020

(54) METHOD FOR PRODUCING PERHALOGENATED HEXASILANE ANION AND METHOD FOR PRODUCING A CYCLIC SILANE COMPOUND

(71) Applicant: Evonik Operations GmbH, Essen (DE)

(72) Inventors: Matthias Wagner, Niddatal (DE); Hans-Wolfram Lerner, Oberursel (DE); Jan Tillmann, Munich (DE); Maximilian Moxter, Munich (DE)

(73) Assignee: Evonik Operations GmbH, Essen (DE)

( * ) Notice: Subject to any disclaimer, the term of this patent is extended or adjusted under 35 U.S.C. 154(b) by 254 days.

(21) Appl. No.: 15/535,842

(22) PCT Filed: Dec. 8, 2015

(86) PCT No.: PCT/DE2015/100522
§ 371 (c)(1),
(2) Date: Aug. 18, 2017

(87) PCT Pub. No.: WO2016/095898
PCT Pub. Date: Jun. 23, 2016

(65) Prior Publication Data
US 2017/0349444 A1    Dec. 7, 2017

(30) Foreign Application Priority Data

Dec. 15, 2014  (DE) .................. 10 2014 118 658
Apr. 14, 2015  (DE) .................. 10 2015 105 690

(51) Int. Cl.
*C01B 33/107* (2006.01)
*C07F 7/08* (2006.01)
*C07F 7/21* (2006.01)

(52) U.S. Cl.
CPC .......... *C01B 33/107* (2013.01); *C07F 7/0896* (2013.01); *C07F 7/21* (2013.01)

(58) Field of Classification Search
CPC .......... C01B 33/04; C01B 33/107; C07F 7/21; C07F 9/5022; C07F 7/0896
See application file for complete search history.

(56) References Cited

U.S. PATENT DOCUMENTS 4,158,010 A * 6/1979 Graf ..................... C07F 7/0801
                                                    556/469
4,374,182 A    2/1983 Gaul et al.
(Continued)

FOREIGN PATENT DOCUMENTS

DE    31 26 240       5/1982
DE    698 08 403 T2   7/2003
(Continued)

OTHER PUBLICATIONS

Laguerre et al., "One-step Synthesis of Dodecamethylcyclohexasilane", J. C. S. Chem. Comm. 1978, p. 272.
Boudjouk et al., "Amine-Promoted Disproportionation and Redistribution of Trichlorosilane: Formation of Tetradecachlorocyclohexasilane Dianion", J. Am. Chem. Soc. 2001, 123, pp. 8117-8118.
(Continued)

*Primary Examiner* — Anthony J Zimmer
*Assistant Examiner* — Syed T Iqbal
(74) *Attorney, Agent, or Firm* — Grüneburg and Myers PLLC

(57) ABSTRACT

The present invention relates to a process for the production of perhalogenated hexasilane anion by reacting halogenated monosilane in the presence of organosubstituted ammonium and/or phosphonium halide at temperatures in a range from 100 to 120° C., wherein no solvent is used, and a process for the production of a cyclic silane compound of the formula $Si_6R_{12}$, by reacting $[X]_2[Si_6Cl_{14}]$ with $AlR_3$ in at least one organic solvent, wherein R is chlorine or methyl and X, the same or different, is a counter-cation and is preferably (Continued)

selected from organosubstituted ammonium, organosubstituted phosphonium, alkali metal ions and [(PEDETA)(H$_2$SiCl)]+.

11 Claims, 6 Drawing Sheets

(56) References Cited

U.S. PATENT DOCUMENTS

| | | | |
|---|---|---|---|
| 6,517,911 B1* | 2/2003 | Matsuki | C23C 18/1212 427/551 |
| 2012/0210873 A1* | 8/2012 | Samura | B01D 53/0462 95/148 |
| 2012/0294791 A1 | 11/2012 | Elangovan et al. | |
| 2014/0012029 A1* | 1/2014 | Abe | C01B 33/04 556/430 |
| 2014/0012030 A1 | 1/2014 | Abe et al. | |
| 2016/0311691 A1 | 10/2016 | Wagner et al. | |

FOREIGN PATENT DOCUMENTS

| | | |
|---|---|---|
| DE | 10 2013 021 306 | 6/2015 |
| DE | 102014118658 | 6/2016 |
| EP | 0902030 | 8/1998 |
| EP | 0 902 030 | 10/2002 |
| JP | 2013095697 | 5/2013 |
| JP | 2013203601 | 10/2013 |
| WO | 2011/094191 | 8/2011 |

OTHER PUBLICATIONS

Gilman et al., "The Formation of Dodecaphenylcyclohexasilane From the Reaction of Dichlorodiphenylsilane with Sodium and with Lithium", Tetrahedron Letters No. 23, pp. 5-7, 1960.
Kipping et al., "Organic Derivatives of Silicon", J. Chem. Soc. Trans. 1921, 119, 830. pp. 647-653.
J. Organomet. Chem. 1977, 125, C29-C32.
Z. Anorg. Allg. Chem. 459, 1979, pp. 123-130.
Monatsh. Chem. 1976, 107, pp. 371-385.
Monatsh. Chem. 1979, 110, pp. 1295-1300.
Angew. Chem. 1963, 75, p. 677.
J. Am. Chem. Soc., "The Effect of Polar Substituents on the Alkali-catalyzed Hydrolysis of Triorganosilanes", 1961, vol. 83, pp. 1916-1921.
PCT/DE2015/100522; PCT International Preliminary Report on Patentability dated Jun. 29, 2017.
Tillmann J et al.; "Chloride-Induced Aufbau of Perchlorinated Cyclohexasilanes from Si2Cl6: A Mechanistic Scenario", Chemistry—A European Journal, Wiley—V C H Verlag Gmbh & Vo. KGAA, Weinheim, DE, vol. 20, No. 30, Jul. 21, 2014; pp. 9234-9238.
Jan Tillmann et al.; "Unexpected Disproportionation of Tetramethylethylenediamine-Supported Perchlorodisilane Cl3SiSiCl3", Inorganic Chemistry, American Chemical Society, Easton, US, vol. 51, No. 15, Jan. 1, 2012, pp. 8599-8606.
PCT/DE2015/100522; PCT International Search Report and Written Opinion of the International Searching Authority dated Apr. 5, 2016.

* cited by examiner

METHOD FOR PRODUCING PERHALOGENATED HEXASILANE ANION AND METHOD FOR PRODUCING A CYCLIC SILANE COMPOUND

The present application is a U.S. National Stage Application based on and claiming benefit and priority under 35 U.S.C. § 371 of International Application No. PCT/DE2015/100522, filed 8 Dec. 2015, which in turn claims benefit of and priority to German Application No. 10 2014 118 658.3 filed 15 Dec. 2014 and German Application No. 10 2015 105 690.9 filed 14 Apr. 2015, the entirety of both of which are hereby incorporated herein by reference.

The present invention relates to a process for the production of perhalogenated hexasilane anion and a process for the production of a cyclic silane compound.

Perhalogenated oligosilanes and polysilanes, such as perhalogenated cyclic hexasilane, form the basis of a wide variety of material-orientated applications, such as the production of amorphous silicon, conductive polymers, silicon layers or also hydrogen storage media, which for their part are of great importance in many fields of industry.

Several processes for producing perhalogenated cyclohexasilane compounds are already known in the state of the art. US 2014/0012030 A1, for example, describes a process for the production of a cyclic silane compound, in which a halogenated silane compound is reacted in a solvent at 0 to 120° C. in the presence of an ammonium or phosphonium salt and a compound acting as a chelating complex.

JP 2013 095697A relates to a process for the production of a hexasilane anion, where trichlorosilane is added drop by drop to a mixture of [nBu$_4$N]Cl, diisopropylethylamine and 1,2-dichloroethane at 25° C. The mixture is stirred first for two hours at 25° C. and then for 24 hours at 50° C. in order to obtain [nBu$_4$N]2[Si$_6$Cl$_{14}$].

In JP 2013 203601A, cyclohexasilane is produced in a reactor by cyclising trihalogenated silanes, wherein the corresponding anions of [Si$_6$X$_{14}$]$^{2-}$ are first formed. These are filtered and reduced to the corresponding cyclohexasilane compounds.

A less complex process for preparing the cyclic hexasilane anion [Si$_6$Cl$_{14}$]$^{2-}$ is described in WO 2011 094191A1. Proceeding from trichlorosilane, the anion is obtained by reaction with a tertiary polyamine ligand, or more precisely an alkyl-substituted polyalkylene polyamine, and a deprotonating agent, such as a tertiary amine.

DE 3126240 C2 relates to a process for the preparation of metallic silicon, in which the reaction of Si$_2$Cl$_6$ with a catalyst selected from the group of ammonium halides, tertiary organic amines, and quaternary ammonium and phosphonium halides at a temperature of 70 to 150° C. into higher silanes than Si$_2$Cl$_6$ is described. Tetrabutyl phosphonium chloride, for example, is used as a catalyst. That document does not provide, however, any more precise details on the structures or product compositions of the perchlorinated polysilanes obtained.

One original approach is based on the work of Kipping et al. (J. Chem. Soc. Trans. 1921, 119, 830) and Gilman et al. (Tetrahedron Lett. 1960, 1, 5; J. Am. Chem. Soc. 1961, 83, 1921). According to this approach, Ph$_2$SiCl$_2$ is reacted with lithium or sodium. In the process, mixtures of the perphenylated Si$_{4-6}$ rings are formed. Hengge et al. describe the reaction to the perchlorinated rings with HCl and catalytic amounts of AlCl$_3$. The use of HBr leads to the corresponding perbrominated rings (Angew. Chem. 1963, 75, 677; J. Organomet. Chem. 1977, 125, C29; Z. Anorg. Allg. Chem. 1979, 130, 123; Monatsh. Chem. 1976, 107, 371; Monatsh. Chem. 1979, 110, 1295).

The more modern approach proceeds from doubly halide-complexed perchlorinated cyclohexasilane. Dai et al. describe the synthesis of Si$_6$Cl$_{12}$, wherein perhydrogenation with lithium aluminium hydride is performed in the first step, followed by perchlorination with chlorine at −90° C.

A disadvantage of the synthesis according to Dai et al. lies in the extremely complex process management, the high costs which that entails and the high hazard potential. The chemicals used are very expensive, and the atom economy is poor. In addition, with hydrogenation, there is a risk that SiH$_4$ will form, which decomposes explosively upon contact with air. Chlorination with gaseous Cl$_2$ is also dangerous.

A disadvantage of all the known processes for the production of perhalogenated cyclohexasilane via a Wurtz coupling is the poor selectivity of the reaction. 6-membered rings are only obtained in low yields in the process and, moreover, are formed together with others. The sub presence sequent chlorination with gaseous HCl is also extremely dangerous.

It is also known to react [Si$_6$Cl$_{14}$]$^{2-}$ with Grignard or lithium organyl compounds to yield permethylated cyclic hexasilane Si$_6$Me$_{12}$ (Boudjouk et al., J. Am. Chem. Soc. 2001, 123, 8117; US 20140012029 A1; DE 69808403).

In addition, Si$_6$Me$_{12}$ can be obtained by means of a Wurtz reaction, in which dichlorodimethyl silane is reacted with lithium. In that reaction, a number of different cyclic silanes are formed (Laguerre et al., J. C. S. Chem. Comm. 1978, 272).

A disadvantage of the known process for the production of perhalogenated cyclohexasilane anions is that the use of solvents and basic additives, such as amines, leads to the increased formation of by-products, which can only be separated from the desired product with difficulty or extremely inadequately. As a result, the product can only be obtained in low yields. Furthermore, the use of additional additives or expensive starting compounds often makes the processes described very costly.

It is a first object of the present invention to provide a process for the production of perhalogenated cyclohexasilane anion which overcomes the disadvantages known from the state of the art. In particular, it is an object to provide a simplified process, with which perhalogenated cyclohexasilane anion can be produced inexpensively at comparatively low temperatures, in great purity and with high yields.

It is a second object of the present invention to provide a process for the production of a cyclic silane compound. In particular, it is an object to provide a process which ensures the selective preparation of the cyclic compounds Si$_6$Cl$_{12}$ and Si$_6$Me$_{12}$ in very good yields and in great purity. Furthermore, the process is intended to enable the preparation of the target molecules in a simple, safe and inexpensive manner.

The first object is achieved by a process for the production of perhalogenated hexasilane anion by reacting halogenated monosilane in the presence of organosubstituted ammonium and/or phosphonium halide at temperatures in a range from 100 to 120° C., wherein no solvent is used.

In the ammonium and/or phosphonium halide used, the halogen is preferably F, Cl, Br and/or I. The ammonium and/or phosphonium halide used is preferably completely organosubstituted, i.e. for example [R$_4$N]X with X=halide, preferably Cl and/or Br. As the organosubstituent, it is preferable to select aryl, alkyl, alkenyl and the like and mixed organosubstituents. It is particularly preferable to use ethyl, butyl and phenyl, also in a mixed substitution.

In the context of the present invention, a hexasilane anion is to be understood as meaning a cyclic hexasilane anion of the formula $[Si_6X_{14}]^{2-}$, X being selected from chlorine, bromine, iodine and/or fluorine, also in a mixed substitution, preferably chlorine or bromine. For the purposes of the present invention, a "perhalogenated hexasilane anion" is completely substituted with halogen atoms.

In the context of the present invention, a halogenated monosilane is preferably to be understood as meaning a compound of the formula $SiH_nX_{4-n}$, wherein n=1 to 3 and X is selected from chlorine, bromine, iodine and fluorine, preferably chlorine and bromine.

The halogenated monosilane trichlorosilane or dichlorosilane is more preferred, preferably trichlorosilane.

In addition, it is preferably contemplated that no additional Lewis base, preferably no amine and/or phosphane, is added.

One embodiment is characterised by the fact that the reaction time is 12 to 96 hours, preferably 24 to 48 hours.

In addition, it is preferable that the ratio of perhalogenated monosilane to organosubstituted ammonium and/or phosphonium halide should be 3:1 to 50:1, preferably 10:1 to 20:1.

It is also preferable, in accordance with the invention, that the organosubstituted ammonium and/or phosphonium halide is the corresponding chloride and bromide, even more preferably [nBu$_4$N]Cl, [Et$_4$N]Cl, [Ph$_4$P]Cl and [nBu$_4$P]Cl.

It is also preferably contemplated that hydrogen (H$_2$) is obtained as a by-product in the production of the hexasilane anion.

The second object is achieved by a process for the production of a cyclic silane compound of the formula $Si_6R_{12}$, by reacting $[X]2[Si_6Cl_{14}]$ with $AlR_3$ in at least one organic solvent, wherein R is chlorine or methyl, and X, the same or different, is a counter-cation and is preferably selected from organosubstituted ammonium, organosubstituted phosphonium, alkali metal ions and [(PEDETA)(H$_2$SiCl)]+.

It is preferable that X is organosubstituted ammonium and/or organosubstituted phosphonium.

In the context of the present invention, organosubstituted ammonium $[R''_4N]^+$ and organosubstituted phosphonium $[R''_4P]^+$ are preferably completely organosubstituted. As the organosubstituents, it is preferable to select aryl, alkyl, alkenyl and the like and mixed organosubstituents.

In the context of the present invention, alkali metal ions are preferably Li$^+$, Na$^+$ and Ka$^+$.

According to the invention, PEDETA of the counter-ion [(PEDETA)(H$_2$SiCl)]$^+$, is pentaethyl diethylene triamine.

In a particularly preferred embodiment, each organosubstituent of the organosubstituted ammonium or of the organosubstituted phosphonium is independently selected from ethyl, propyl, butyl and phenyl.

It is also preferable that the organic solvent is selected from benzene, cyclohexane, n-hexane, n-heptane, chloroform and dichloromethane.

In a further preferred embodiment, the process is carried out in a temperature range from 20° C. to 120° C.

Furthermore, it is preferable that the ratio of $[X]2[Si_6Cl_{14}]$ to AlR$_3$ should lie in a range of 5:1 to 1:10, preferably 1:1 to 1:5, even more preferably that it should be 1:2.

In a preferred embodiment, the Si$_6$Cl$_{12}$ obtained is cleaved in a subsequent reaction, preferably with chlorine or bromine.

It has surprisingly been found that the simplified solvent-free process makes it possible to produce perhalogenated cyclohexasilane anion in high purity and with high yields of up to 80%, proceeding from halogenated monosilane. In contrast to the known state of the art, in which the amines used typically act as deprotonating agents (R$_3$N+ HCl→R$_3$HNCl), there is in the present case a redox reaction accompanied by H$_2$ separation. During the present synthesis to produce the hexasilane anion, the by-products H$_2$ and SiCl$_4$ are inevitably formed, and the by-products H$_2$SiCl$_2$ and $[Si_6Cl_{13}H]^{2-}$ may possibly also form. Because of their low boiling points of −252° C. and 8.4° C., the by-products H$_2$ and H$_2$SiCl$_2$ formed during the reaction can be removed in a simple manner, since they are gaseous under normal conditions and hence do not require any special purification steps. Because of its low boiling point of 32° C., surplus HSiCl$_3$ can be removed by applying a vacuum or can be returned to the reaction in a suitable apparatus. In addition, the trichlorosilane used is less expensive than the frequently used Si$_2$Cl$_6$. Furthermore, the by-product $[Si_6Cl_{13}H]^{2-}$ obtained by hydrogenation, analogously to the perhalogenated hexasilane anion, can be reacted to the desired subsequent product, cyclohexasilane.

A further advantage of the process for the production of perhalogenated hexasilane anion is the exclusion of by-products which would arise in the course of activating solvent. The formation of such solvent-dependent by-products often requires labour-intensive purification of the desired product. Another advantage is the preferred dispensing with additional Lewis bases, such as amines and phosphanes, since the purity of the product is enhanced thanks to the low formation of by-product. Furthermore, it is no longer necessary to separate the Lewis base from the desired product, which, because of the high boiling points of the amines typically used, would require complex purification steps. What is more, dispensing with solvent and further additives enables more cost-efficient synthesis. Despite the simplified process, it is possible to obtain the desired product in a shorter reaction time of 24 to 48 hours.

It has surprisingly been found that the process of the invention for the production of a cyclic silane compound ensures the selective preparation of the cyclic compounds Si$_6$Cl$_{12}$ and Si$_6$Me$_{12}$ in very good yields (>80%) and with high purity. In particular, no further silicon compounds form in addition to the target compound. What is more, the product Si$_6$Cl$_{12}$ of the process of the invention is free of carbon and is thus suitable for further applications, e.g. as a precursor for semiconductor and photovoltaic materials. The compounds can be isolated and characterised beyond doubt by means of monorystal x-ray structural analysis and NMR spectroscopy.

A further advantage of the process of the invention of the invention is that the salt $[X]_2[Si_6Cl_{14}]$ is accessible in a simple manner, proceeding from various perchlorinated silanes and above all also from HSiCl$_3$ (see, for example, DE102014118658.3; DE102013021306.1).

The process of the invention makes a single-stage and inexpensive synthesis of the cyclic silane compound possible. The present reaction is one of decomplexing, or chloride abstraction. Experiments showed that decomplexing with other Lewis acids, such as AlBr$_3$ and FeCl$_3$, does not lead to the desired products.

The Si$_6$Cl$_{12}$ obtained by the process of the invention can be cleaved by various subsequent reactions. With chlorine gas or bromine, for example, it can be converted into open-chain and/or shorter perhalogenated silanes. In addition, the formal synthesis component [:SiCl$_2$] can be obtained by chemical, electrochemical, photolytic or thermolytic cleavage.

In addition, with the process of the invention it is also possible to obtain the permethylated cyclic hexasilane Si$_6$Me$_{12}$ in very good yields (>80%) simply by a reaction with AlMe3.

Further features and advantages of the invention will become clear from the following description, drawings and example embodiments. There, FIG. 1 shows a $^{29}$Si-{$^1$H} NMR spectrum measured in CD$_2$Cl$_2$, the solution obtained in variant A of the synthesis of [nBu$_4$N]$_2$[Si$_6$Cl$_{14}$].

GENERAL WORKING CONDITIONS

All the reactions in the process for the production of perhalogenated hexasilane anion were carried out under dry argon or nitrogen. CD$_2$Cl$_2$ was dried over CaH$_2$ and freshly distilled before use. HSiCl$_3$ and [nBu$_4$N]Cl are commercially available; [nBu$_4$N]Cl was dried in a vacuum at room temperature for 2 d. $^{29}$Si NMR spectra were recorded with a Bruker Avance III HD 500 MHz spectrometer; the spectra were calibrated against the external standard SiMe$_4$ ($\delta$($^{29}$Si) =0).

Synthesis of [nBu$_4$N]2[Si$_6$Cl$_{14}$]

Figure 1:
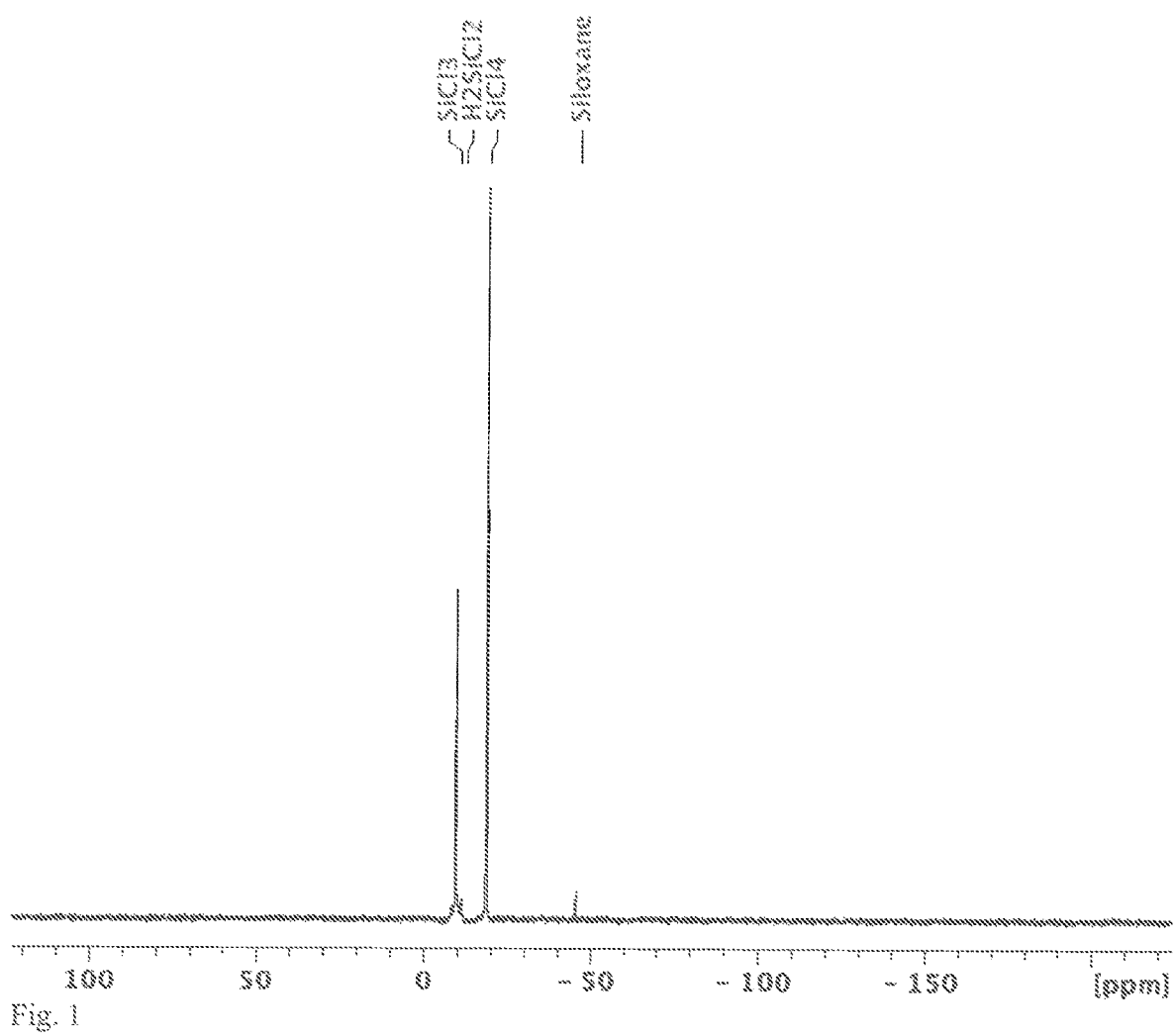

Variant A:

A jar was placed in an autoclave and filled with [nBu$_4$N]Cl (5.0 g, 18 mmol) and HSiCl$_3$ (30 mL, 40.2 g, 297 mmol) in an argon-filled glovebox. The autoclave was sealed and tested for leaks under 50 bar nitrogen pressure. After that, the reaction mixture was heated to 100 to 120° C. for 44 h. During the time of the reaction, there was a slight overpressure of approx. 5 bar in the autoclave. The temperature was measured on the outside of the autoclave between the metal wall and the heating jacket. After the reaction vessel had cooled, a pressure of 50 bar was generated three times in the vessel with nitrogen and then released again in order to remove any hydrogen and H$_2$SiCl$_2$ that had formed. The jar was removed in an argon counterflow. In the jar, there was a large amount of white solid on top of a small amount of clear colourless liquid (the amounts are stated relative to the amounts of educts used, HSiCl$_3$ and [nBu$_4$N]Cl). A $^{29}$Si{$^1$H} NMR spectrum of the solution in CD$_2$Cl$_2$ mainly showed the chemical shift of HSiCl$_3$ (–10.0 ppm) and SiCl$_4$ (–18.9 ppm). In addition, minor components identified in the $^{29}$Si{$^1$H} NMR spectrum of the solution were H$_2$SiCl$_2$ (–11.5 ppm) and a siloxane which was not definitively identifiable (–46.0 ppm, e.g. Cl$_3$SiOSiCl$_3$) or a mixture of different siloxanes (see FIG. 1). The origin of the siloxane is not known; the source might, however, be attributable to traces of water which might have entered the reaction mixture during the refilling or transferring step.

Figure 2:
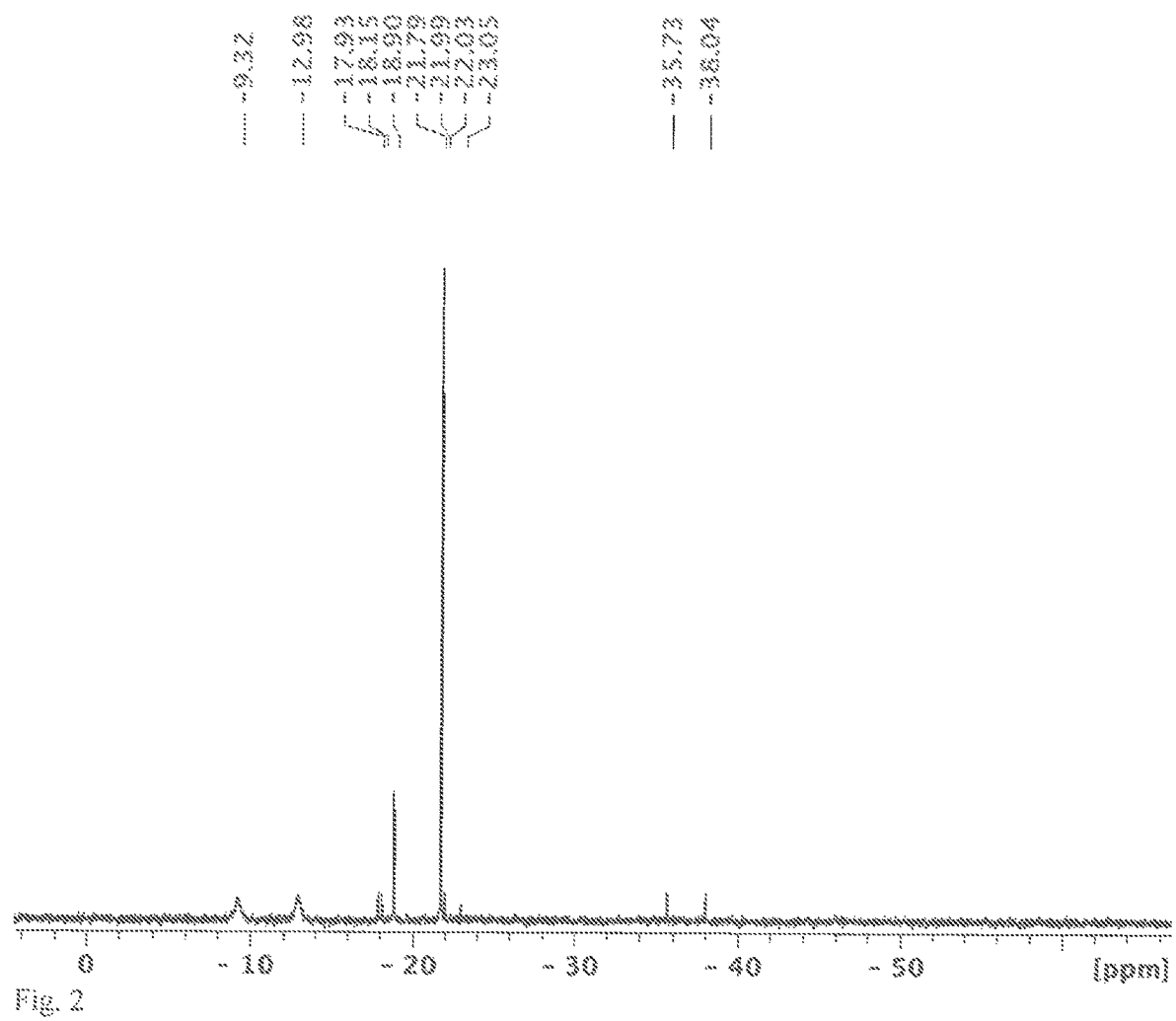
FIG. 2 shows a $^{29}$Si NMR spectrum measured in CD$_2$Cl$_2$, the solid obtained in variant A of the synthesis of [nBu$_4$N]2[Si$_6$Cl$_{14}$]. The $^{29}$Si NMR spectrum of the raw product shown in FIG. 2 was measured in CD$_2$Cl$_2$ after applying a vacuum and demonstrates the low level of by-product formed.

The solid contained in the reaction jar was dried in a vacuum. 9.9 g product were isolated (yield≥80%). The $^{29}$Si NMR spectrum of the solid in CD$_2$Cl$_2$ showed the chemical shift of [Si$_6$Cl$_{14}$]$^{2-}$ (21.8 ppm). As a by-product, [Si$_6$Cl$_{13}$H]$^{2-}$ (–36.9 ppm (d, J=230 Hz, 1 Si), –23.0 ppm (d, J=2 Hz, 1 Si), –22.0 ppm (d, J=4 Hz, 2 Si), (–18.0 ppm (d, J=22 Hz, 2 Si)) were identified. In addition, HSiCl$_3$ (–11.1 ppm (d, J=363 Hz)) and SiCl$_4$ (–18.9 ppm) could also be identified in the spectrum (see FIG. 2).

Figure 3:
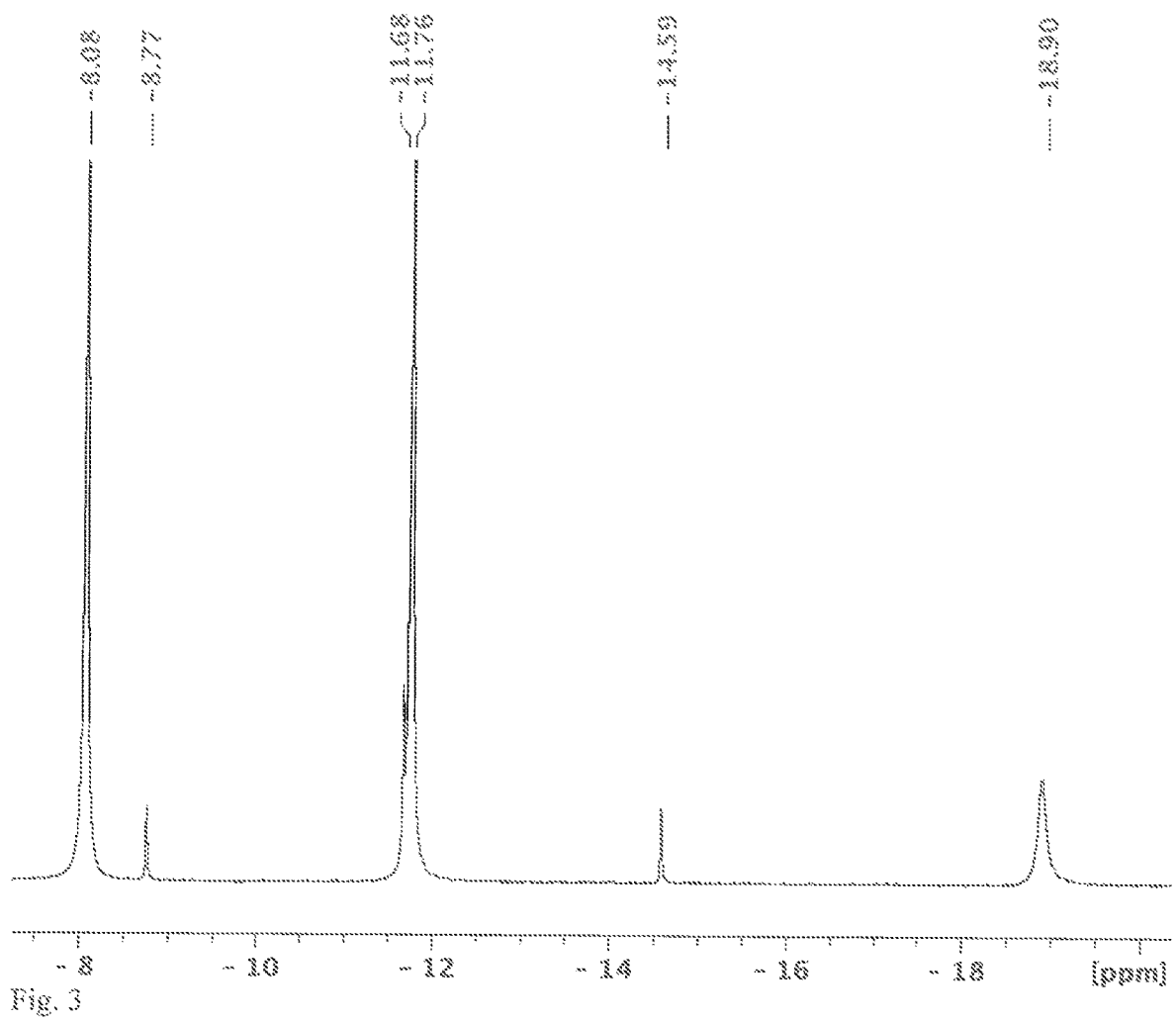
FIG. 3 shows a $^{29}$Si NMR spectrum measured in C$_6$D$_6$, the solution obtained in variant B of the synthesis of [nBu$_4$N]2[Si$_6$Cl$_{14}$].
Figure 4:
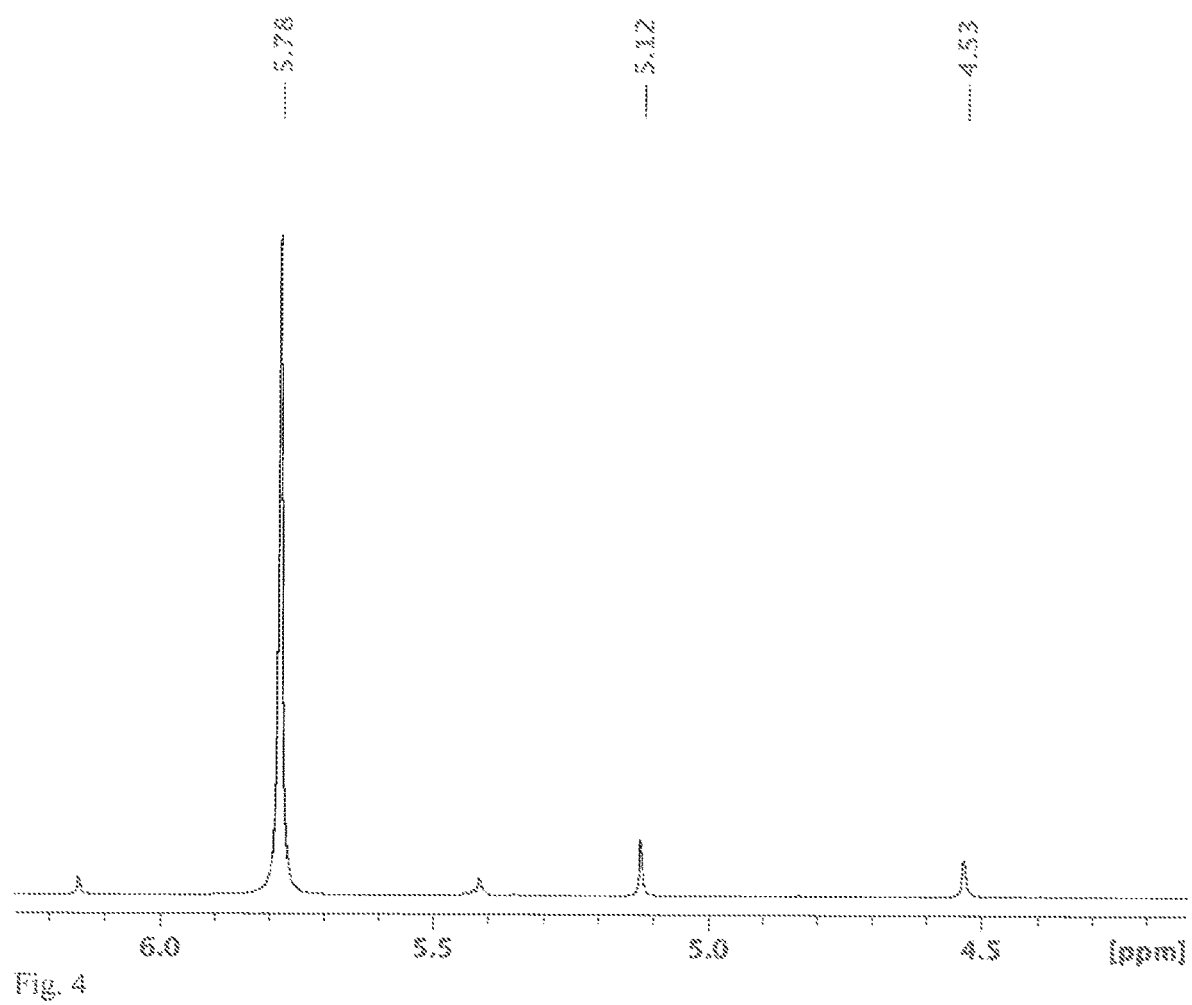
FIG. 4 shows a $^1$H NMR spectrum measured in C$_6$D$_6$, the solution obtained in variant B of the synthesis of [nBu$_4$N]2[Si$_6$Cl$_{14}$].
Figure 5:
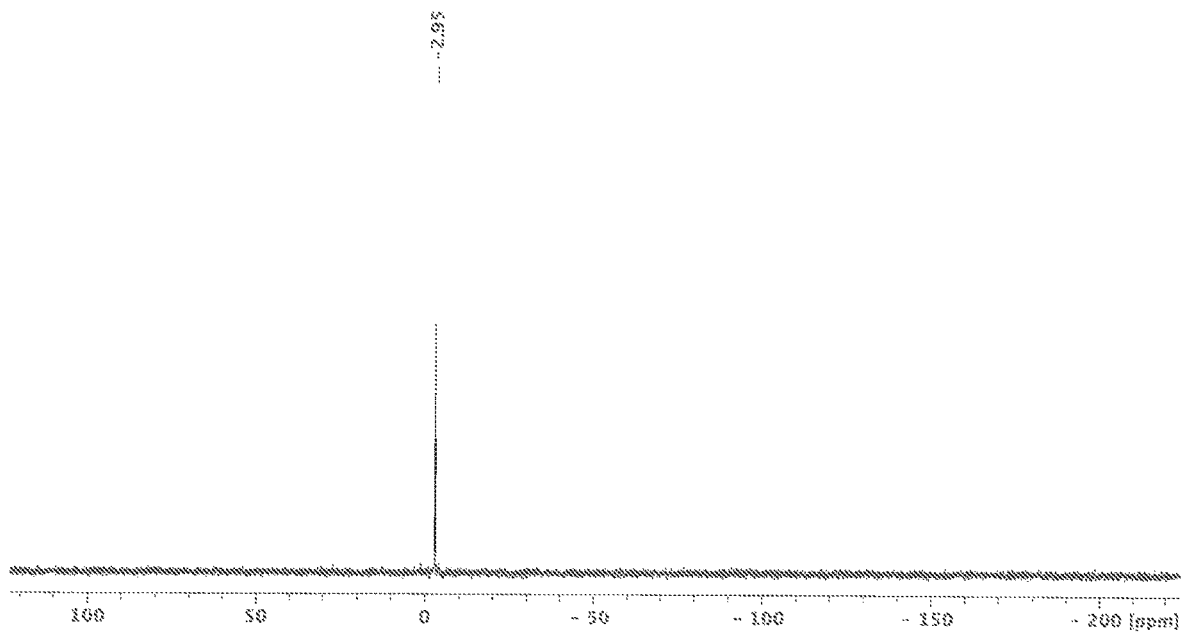
FIG. 5 shows a $^{29}$Si NMR spectrum of the cyclic silane compound Si$_6$Cl$_{12}$, produced by method A, in C$_6$D$_6$ at 99.4 MHz.
Figure 6:
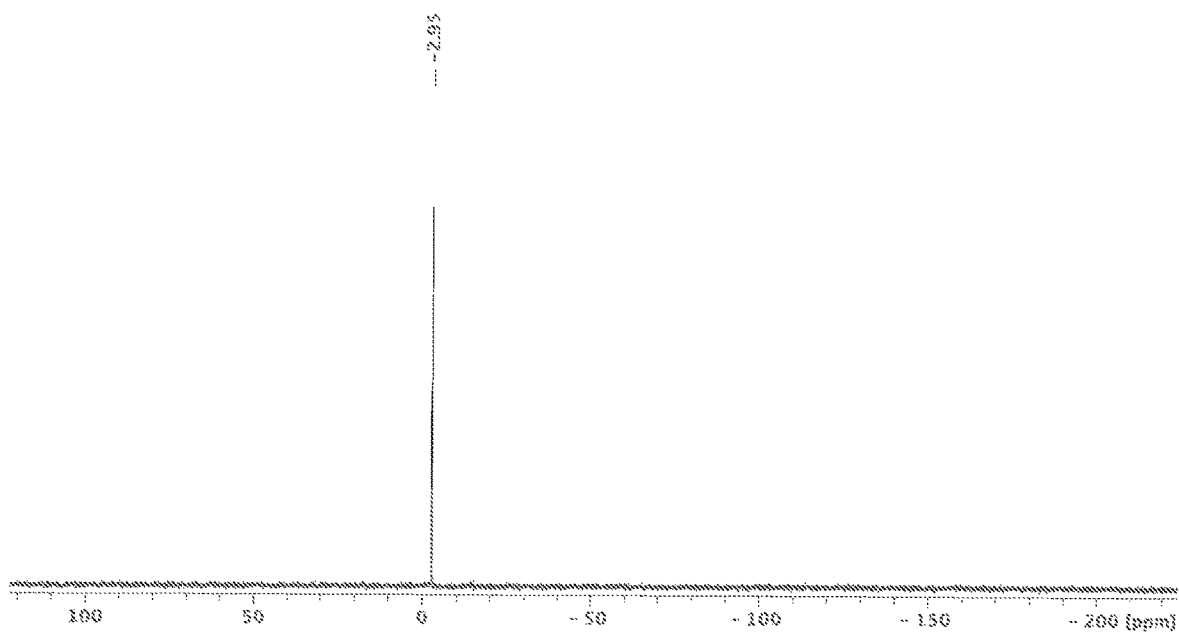
FIG. 6 shows a $^{29}$Si NMR spectrum of the silane compound Si$_6$Cl$_{12}$, produced by method B, in C$_6$D$_6$ at 99.4 MHz.
Figure 7:
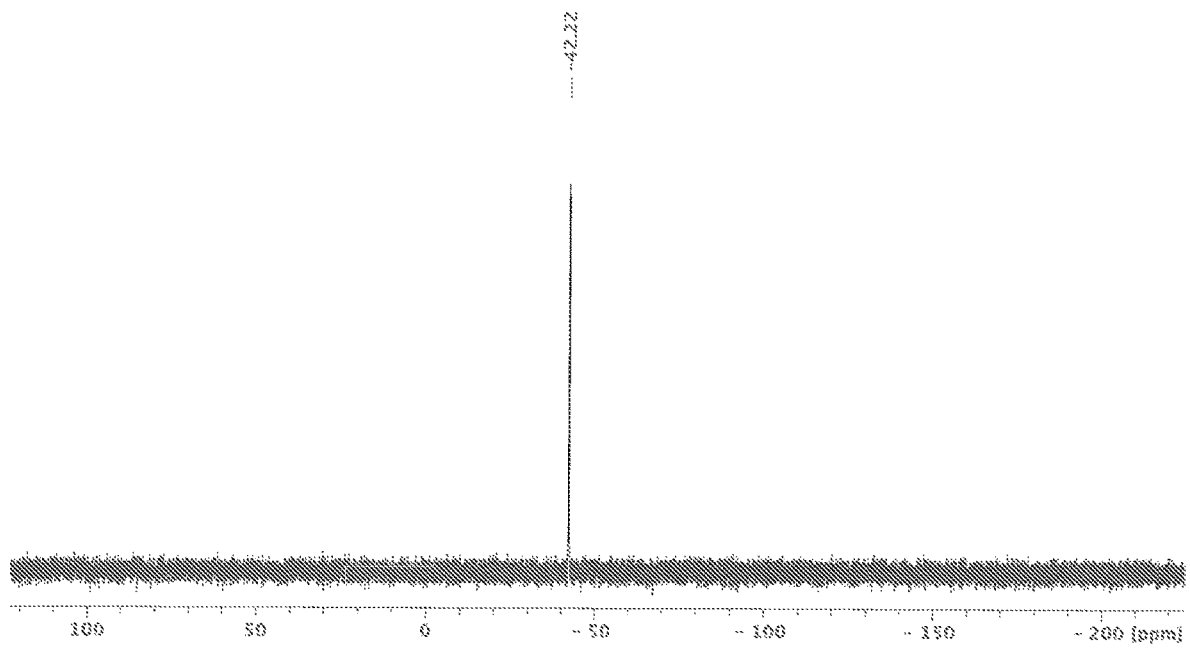
FIG. 7 shows a $^{29}$Si NMR spectrum of the silane compound Si$_6$Me$_{12}$ in C$_6$D$_6$ at 99.4 MHz.

Variant B:

An NMR tube was filled with [nBu$_4$N]Cl (0.16 g, 0.6 mmol) and HSiCl$_3$ (0.5 mL, 0.67 g, 5.0 mmol) and C$_6$D$_6$ (0.2 mL) in an argon-filled glovebox and melted in a vacuum. The solvent, C$_6$D$_6$, is only needed for the NMR measurement and was already added at the beginning for process engineering reasons. The involvement of benzene in the reaction was ruled out in an experiment without solvent. The sealed NMR tube was heated to 120° C. for 48 h. After the reaction time, a $^{29}$Si NMR spectrum was measured. In the spectrum, the chemical shifts of HSiCl$_3$ (–9.9 ppm, d, J=364 Hz), H$_2$SiCl$_2$ (–11.7 ppm, t, J=289 Hz) and SiCl$_4$ (–18.9 ppm) could be identified (see FIG. 3). There is no shift of the product [Si$_6$Cl$_{14}$]$^{2-}$, because it is sparingly soluble in benzene. It was possible to identify it unambiguously by means of x-ray crystallography. In addition to the chemical shifts of the butyl group, the shifts of HSiCl$_3$ (5.78 ppm), H$_2$SiCl$_2$ (5.12 ppm) and H$_2$ (4.53 ppm) were identified in the $^1$H NMR spectrum (see FIG. 4). Carrying out this reaction in sealed glass vessels is extremely dangerous, since they are under considerable pressure because of the gases forming. The experiment was only carried out in the molten NMR tube so that the gases forming could be detected beyond doubt.

Synthesis of [Et$_4$N]2[Si$_6$Cl$_{14}$] and [Ph$_4$P][Si$_6$Cl$_{14}$]:

The syntheses with [Et$_4$N]Cl and [Ph$_4$P]Cl as the educt proceed analogously to the synthesis proceeding from [nBu$_4$N]Cl. Because of the poorer solubilities, the yields are lower (≤50%); the reaction times should therefore be made longer, preferably 72 hours. In both cases, [Si$_6$Cl$_{13}$H]$^{2-}$ is also obtained with the corresponding counter-ion as a by-product. The analytical method is limited in both cases to x-ray crystallography, since the main products obtained are not soluble; using monocrystal structural analysis, [Si$_6$Cl$_{14}$]$^{2-}$ was clearly identified as the product.

Synthesis of Si$_6$Cl$_{12}$

Method A:

[nBu$_4$N]2[Si$_6$Cl$_{14}$] (1.00 g, 0.87 mmol) and AlCl$_3$ (0.24 g, 1.80 mmol) were prepared in benzene (6 mL) and stirred overnight at room temperature. After that, the solvent was removed in a vacuum. The colourless residue obtained was absorbed in dry cyclohexane and the suspension obtained was heated to 80° C. for 0.5 h. The batch was filtered and the solvent of the clear filtrate was removed in a vacuum. 0.50 g Si$_6$Cl$_{12}$ were obtained as a colourless solid (yield: 0.84 mmol, corresponding to 97%). The $^{29}$Si NMR spectrum (C$_6$D$_6$; 99.4 MHz; see FIG. 1) of the solid showed the chemical shift of Si$_6$Cl$_{12}$ (–2.95 ppm). An examination by x-ray crystallography of monocrystals, selected from the solid obtained, revealed the crystal structure of Si$_6$Cl$_{12}$. In the filter cake obtained, the monocrystal x-ray structures of [nBu$_4$N][AlCl$_4$] and [nBu$_4$N][AlCl$_4$]*C$_6$H$_6$ were identified.

Method B:

[nBu$_4$N]$_2$[Si$_6$Cl$_{14}$] (5.10 g, 4.44 mmol) and AlCl$_3$ (1.23 g, 9.23 mmol) were prepared in benzene (45 mL) and stirred overnight at room temperature. After that, the solvent was removed in a vacuum. The colourless residue obtained was absorbed in dry hexane and the suspension obtained was heated to 80° C. for 0.5 h. The batch was filtered, concentrated to 10 mL by evaporation and stored at −72° C. for crystallisation. 2.51 g Si$_6$Cl$_{12}$ were obtained as a colourless crystalline solid (yield: 4.23 mmol, corresponding to 95%). The $^{29}$Si NMR spectrum (C$_6$D$_6$; 99.4 MHz; see FIG. 2) of the solid showed the chemical shift of Si$_6$Cl$_{12}$ (−2.95 ppm). An examination of the monocrystals by x-ray crystallography likewise verified the product obtained as Si$_6$Cl$_{12}$.

Method C:

[nBu$_4$N]2[Si$_6$Cl$_{14}$] (5.8 g, 5.1 mmol), which for processing reasons also contains [nBu$_4$N]Cl (2.2 g, 7.0 mmol), and AlCl$_3$ (2.4 g, 18.0 mmol) were prepared in benzene (60 mL) and stirred overnight at room temperature. After that, the solvent was removed in a vacuum. The residue obtained was an intense yellow and was absorbed in hexane (50 mL) and heated to 80° C. for 0.5 h. The supernatant was filtered, and the clear, colourless filtrate was concentrated to 10 mL by evaporation and stored at −72° C. for crystallisation. After 24 hours, the supernatant solution was decanted and 0.5 g solid were isolated. The solution was concentrated to approx. 10 mL by evaporation and stored at −72° C. for further crystallisation. Si$_6$Cl$_{12}$ was isolated as a colourless solid (total yield: 2.6 g, 87%). The $^{29}$Si NMR spectrum of the solid showed the chemical shift of Si$_6$Cl$_{12}$ (−2.95 ppm). An examination by x-ray crystallography of monocrystals, selected from the solid obtained, revealed the crystal structure of Si$_6$Cl$_{12}$. In the filter cake obtained, the monocrystal x-ray structures of [nBu$_4$N][AlCl$_4$] and [nBu$_4$N][AlCl$_4$]*C$_6$H$_6$ were identified.

Synthesis of Si$_6$Me$_{12}$

Method A:

[nBu$_4$N]2[Si$_6$Cl$_{14}$] (1.00 g, 0.87 mmol) was covered with an AlMe$_3$/heptane solution (1.75 mL, 3.5 mmol, 2 mol/L) and then mixed with dichloromethane (5 mL). The batch was stirred at room temperature for 7 days. After that, the solvent was removed in a vacuum. The residue obtained was reddish-brown and was absorbed in 4 mL hexane and heated to 80° C. for 10 min. The supernatant was filtered, and the clear, colourless filtrate was concentrated to 1 mL by evaporation and stored at −72° C. for crystallisation. After 48 hours, the supernatant solution was decanted and the colourless solid was dried in a vacuum. 249 mg Si$_6$Me$_{12}$ were obtained (yield: 0.714 mmol, corresponding to 82%). The $^{29}$Si NMR spectrum (C$_6$D$_6$; 99.4 MHz; see FIG. 3) of the solid showed the chemical shift of Si$_6$Me$_{12}$ (−42.2 ppm).

It is within the scope of the invention that the process for the production of perhalogenated hexasilane anion can be followed by the process of the invention for the production of a cyclic silane compound.

The features of the invention disclosed in the above description, the claims and the drawings can be essential both individually and in any combination to implementing the invention in its various embodiments.

The invention claimed is:

1. A process for the production of perhalogenated hexasilane anion by reacting halogenated monosilane in the presence of organosubstituted ammonium and/or phosphonium halide at temperatures in a range from 100 to 120° C., followed by removal of by-products comprising hydrogen by raising and releasing pressure, wherein no solvent is used,
   wherein said organosubsitutued ammonium and/or phosphonium halide is substituted with at least one substituent selected from the group consisting of aryl, alkyl and alkenyl.

2. The process for the production of perhalogenated hexasilane anion as claimed in claim 1, wherein the halogenated monosilane is trichlorosilane or dichlorosilane.

3. The process for the production of perhalogenated hexasilane anion as claimed in claim 1, wherein no additional Lewis base is added.

4. The process for the production of perhalogenated hexasilane anion as claimed in claim 1, wherein the reaction time is 12 to 96 hours.

5. The process for the production of perhalogenated hexasilane anion as claimed in claim 1, wherein the weight ratio of halogenated monosilane to organosubstituted ammonium and/or phosphonium halide is 3:1 to 50:1.

6. The process for the production of perhalogenated hexasilane anion as claimed in claim 1, wherein the organosubstituted ammonium and/or phosphonium halide is selected from [nBu$_4$N]Cl, [Et$_4$N]Cl, [Ph$_4$P]Cl and [nBu$_4$P]Cl.

7. A process for the production of a cyclic silane compound of the formula Si$_6$R$_{12}$ where R is a halogen, comprising:
   producing perhalogenated hexasilane anion by reacting halogenated monosilane in the presence of organosubstituted ammonium and/or phosphonium halide at temperatures in a range from 100 to 120° C., followed by removal of by-products comprising hydrogen by raising and releasing pressure, wherein no solvent is used,
   wherein said organosubsitutued ammonium and/or phosphonium halide is substituted with at least one substituent selected from the group consisting of aryl, alkyl and alkenyl, and reacting said perhalogenated hexasilane anion with AlR'$_3$ in at least one organic solvent, wherein R' is chlorine or methyl.

8. The process for the production of a cyclic silane compound as claimed in claim 7, wherein the organic solvent is selected from benzene, cyclohexane, n-hexane, n-heptane, chloroform and dichloromethane.

9. The process for the production of a cyclic silane compound as claimed in claim 7, wherein the process is carried out in a temperature range from 20° C. to 120° C.

10. The process for the production of a cyclic silane compound as claimed in claim 7, wherein the weight ratio of perhalogenated hexasilane anion to AlR'$_3$ lies in a range of 5:1 to 1:10.

11. The process as claimed in claim 7, wherein the Si$_6$Cl$_{12}$ obtained is cleaved in a subsequent reaction.

* * * * *